United States Patent [19]

Simard

[11] Patent Number: 5,422,961
[45] Date of Patent: Jun. 6, 1995

[54] APPARATUS AND METHOD FOR IMPROVING RECOGNITION OF PATTERNS BY PROTOTYPE TRANSFORMATION

[75] Inventor: Patrice Y. Simard, Eatontown, N.J.

[73] Assignee: AT&T Corp., Murray Hill, N.J.

[21] Appl. No.: 862,696

[22] Filed: Apr. 3, 1992

[51] Int. Cl.⁶ .............................................. G06K 9/62
[52] U.S. Cl. .................................. 382/224; 382/159; 382/276
[58] Field of Search ....................... 382/27, 36, 14, 15, 382/41, 37, 38, 39; 395/3, 61

[56] References Cited

U.S. PATENT DOCUMENTS

| | | | |
|---|---|---|---|
| 4,697,242 | 9/1987 | Holland et al. | 382/27 |
| 4,977,603 | 12/1990 | Irie et al. | 382/36 |
| 5,058,180 | 10/1991 | Khan | 382/36 |
| 5,077,807 | 12/1991 | Boskey | 382/36 |
| 5,142,593 | 8/1992 | Kaseno | 382/36 |
| 5,181,259 | 1/1993 | Rorvig | 382/36 |

OTHER PUBLICATIONS

Broomhead et al., "Multivariable Functional Interpolation & Adoptive Networks"; *Complex Systems* 2 (1988) pp. 321–355.
Duda et al., Nonparametric Techniques, Chapter 4, *Pattern Classification and Scene Analysis*, (1973) pp. 85–105.

Primary Examiner—Joseph Mancuso
Attorney, Agent, or Firm—Martin I. Finston; Charles E. Graves

[57] ABSTRACT

Speed and accuracy of the recognition process for an alphanumeric automated recognizer is enhanced by a novel scheme for comparing known prototype symbols to examples of unknown symbol. The scheme is invariant with respect to a selected set of small transformations of either the prototypes or the examples, requires only a few operators, and generates accuracy rates comparable to a human operator. The small transformations of interest are expressed locally by a process in which, during the data processing, the derivative of the transformed image with respect to the parameter that controls the transformation is calculated. This directional derivative then is used as the generator of interest in the recognition machine and is incorporated into the comparison process. The derivatives are generated by using tangent plane concepts, which yield a useful approximation of an otherwise not quantifiable complex surface in the neighborhood occupied by the unknown example. Computation time is decreased and recognition accuracy is increased.

10 Claims, 11 Drawing Sheets

TRUE TRANSFORMATIONS

PATTERNS IN THE TANGENT PLANE

TANGENT PLANE EQUATION

CLASS BOUNDARY

ORIGINALS

GENERATORS +  +

DIAGONAL TRANSLATION =

VERTICAL TRANSLATION

HORIZONTAL TRANSLATION

TRUE TRANSFORMATIONS

PATTERNS IN THE TANGENT PLANE

TANGENT PLANE EQUATION

APPARATUS AND METHOD FOR IMPROVING RECOGNITION OF PATTERNS BY PROTOTYPE TRANSFORMATION

FIELD OF THE INVENTION

This invention relates to apparatus and methods for recognizing patterns and, particularly, to a novel method for classifying alphanumeric patterns in a pattern recognition machine which is insensitive to specific transformations of the input or unknown pattern.

BACKGROUND OF THE INVENTION

In pattern recognition machines, such as that described in the patent application, Ser. No. 07/770,267, filed Oct. 3, 1991 and assigned to Applicants assignee, it is usual to store large amount of prototype patterns and compare them to a given example or unknown input symbol for identification. In several pattern comparison processes using common algorithms, such as K-nearest Neighbor (KNN), Parzen windows, and radial basis functions (RBF), the comparison is done by means of generating a distance measure, for example the euclidian distance, between patterns and prototypes. The KNN and Parzen windows algorithms are described in the book "Pattern Classification and Scene Analysis" by Duda and Hart, 1973; and the RBF algorithm is described in the article, "Multivariate Functional Interpolation and Adaptive Networks" appearing in "Complex Systems," by Broomhead, D. S. and Lowe, D., which are hereby incorporated by reference.

The several prototypes which have the smallest such "distances" from the example each cast a vote. The voting determines the class of the example. Variations on the voting scheme and on how the distance measure is used account for the difference between the KNN, Parzen windows RBF and other distance-based classification algorithms.

These classification methods find important applications in optical character recognition.

One key to successfully utilizing these algorithms in pattern recognition is the choice of process for comparing prototypes to example, because the process chosen determines the accuracy of the classification.

It is desirable for the comparison scheme to be "invariant" to small transformations of both the prototypes and the examples. The term "invariance" as used herein refers to the invariance of the nature of a pattern in the perception of a human observer, with respect to some transformation of that pattern. The term is further is described in the above-noted patent application Ser. No. 07/770,267, which is hereby incorporated by reference.

In the case of alphanumeric patterns, the possible transformations of the image include: translation, rotation, scaling, hyperbolic deformations, line thickness changes, grey-level changes, and others. An example of a pattern's invariance to small transformations is given by considering the nature of the image of a "3" pattern: it is invariant by translation, which is a linear displacement of the image. That is, translating the image does not change the meaning of the image to a human observer. On the other hand, the nature of the image of a "6" is not invariant by a rotation of 180 degrees: to a human observer it becomes a "9". To the same observer, however, a small rotation of the upright "6" image does not change the meaning of the image.

A desirable property of a pattern recognition machine is that its output be invariant with respect to some specific transformation of its input. In many prior art processes by which the processing machine classifies by comparing examples or unknown patterns to prototypes, features of the example first are extracted, and the comparison is made on the features rather than on the raw data. The desired property of these extracted features is that they are more invariant to some transformation of the image than the unprocessed image. In alphanumeric classification, for instance, bars and loops are high level features which are less affected by low level transformations such as a translation of the image.

A particular example of such a system is a machine for making accurate classifications as to the identity of letters and numbers in the address block of envelopes being processed at a postal service sorting center. Such a machine may utilize the information processing of the KNN, Parzen window or RBF algorithm. In these machines it is necessary that the classifier recognize accurately the many shapes and sizes in which each letter or number are formed in script placed on the envelopes by postal service users.

Given an unlimited amount of prototypes and recognition time, this type of system could exhibit or extract the relevant invariances from the raw data alone; but this is often not feasible because required storage capacity and recognition time grow linearly with the number of prototypes.

Two common strategies, therefore, are invoked in the prior art to deal with these limitations. The first is to carefully select the set of prototypes. This strategy often is ineffectual, however, because an insufficient number of prototype gives very poor recognition accuracy and performance. Large amounts of prototypes, if available at all, entail having to make many comparisons in the recognition phase, a process which drastically slows the recognition time.

The second strategy commonly used in the prior art is to compare a set of features extracted from the patterns rather than from the raw data. Although this strategy increases the comparison time, it has the advantage of using the more relevant information about the prototypes. Thus, if the system can operate with fewer prototypes, a gain in speed can be obtained. For instance, if the extracted features are invariant with respect to some transformation, all the prototypes which differ from each other by that transformation are redundant and can be removed from the set of prototypes used during recognition.

Unfortunately, the choice of features is very sensitive and is subject to complex heuristics. In many cases any resultant gain in speed is at the expense of performance because the features are not truly invariant.

The factors of recognition time and correctness therefore are not yet satisfactorily addressed and remain an issue in recognition engines which utilize the information processing steps of the KNN algorithm and other distance based systems to recognize handwritten script in the address box of envelopes.

SUMMARY OF THE INVENTION

In simplest terms, the invention is a new and useful way to compare prototypes to examples in recognition engines which practice the KNN, Parzen window and RBF algorithms.

According to the invention, the speed and accuracy of the process by which the recognition engine classifier recognizes alphanumeric symbols, is appreciably enhanced by the use of a new comparison scheme which is invariant with respect to a selected set of small transformations of the prototypes or the examples. The transformations are expressed using only a few operators. Specifically, the invention teaches a method for choosing a "distance" function that allows accurate choices to be made as to the class of the example which is invariant to small transformations of either the example or the prototype.

By way of background, the invariance of a pattern p, such as the number "3", for example, with respect to a group T of transformations of the pattern "3", can be interpreted as the set S of all the patterns which can be obtained from the pattern "3" by the transformation of the group T. This set is typically a non-linear (hyper-dimensional) surface in a even higher dimensional space. In practice, the surface cannot be expressed analytically; that is, it cannot be represented as a mathematical function which has a solution.

However, the tangent plane to the surface at the data point, p, can be expressed analytically, and is a useful approximation of the complex surface, at least in the neighborhood of the point p, which is the neighborhood of interest.

The tangent plane has the further advantage of being completely specified by a few vectors. For example, if the surface is n dimensional, exactly n vectors are necessary to describe the tangent plane. For the set of transformations consisting of all the possible translations of 2-dimensional images, for example, two vectors (corresponding respectively to horizontal and vertical translation) are needed to completely describe the tangent plane.

The small transformations of interest are expressed "locally" by a process in which, during the data processing, the derivative of the transformed image with respect to the parameter that controls the transformation is calculated. This directional derivative, also called "Lie derivative", then is used as the generator of interest in the machine. These generators themselves can be incorporated into the comparison process used by the "distance based" recognizers.

The transformation with respect to which invariance is desired, can be efficiently expressed by using the tangent vectors to the surface of transformation. The invention permits any desired number of possible invariances to be included in any particular recognition engine process. A greater number of invariances can relatively easily be expressed by tangent vectors, and has the advantage of introducing more knowledge about the classes to be recognized.

DETAILED DESCRIPTION OF AN ILLUSTRATIVE EMBODIMENT

Figure 1:
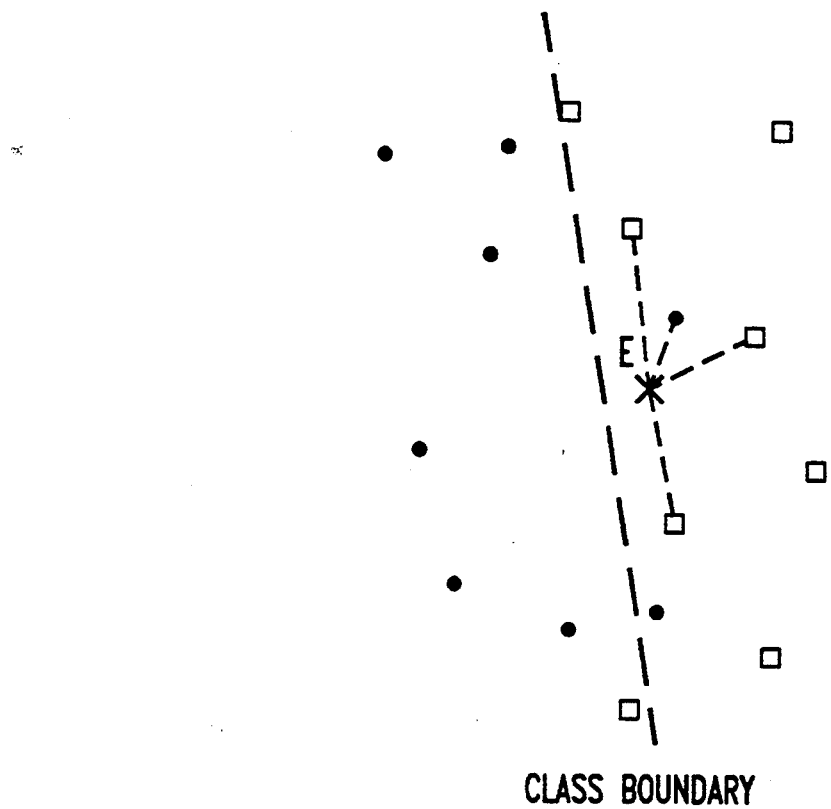
FIGS. 1 and 2 are graphs illustrating the concept of class boundaries.

An appreciation of the invention will be more readily gained by first noting with reference to FIG. 1 the principle of the KNN algorithm. In the illustration, there are two classes of patterns presented, represented by circles and squares, and the example E is to be classified from one of the two classes. In this case, assume the four closest neighbors to the example are considered (K=4). Since there are 3 prototypes of class "square" among the 4 nearest neighbors of the example "E", the example is correctly classified as a "square".

Figure 2:
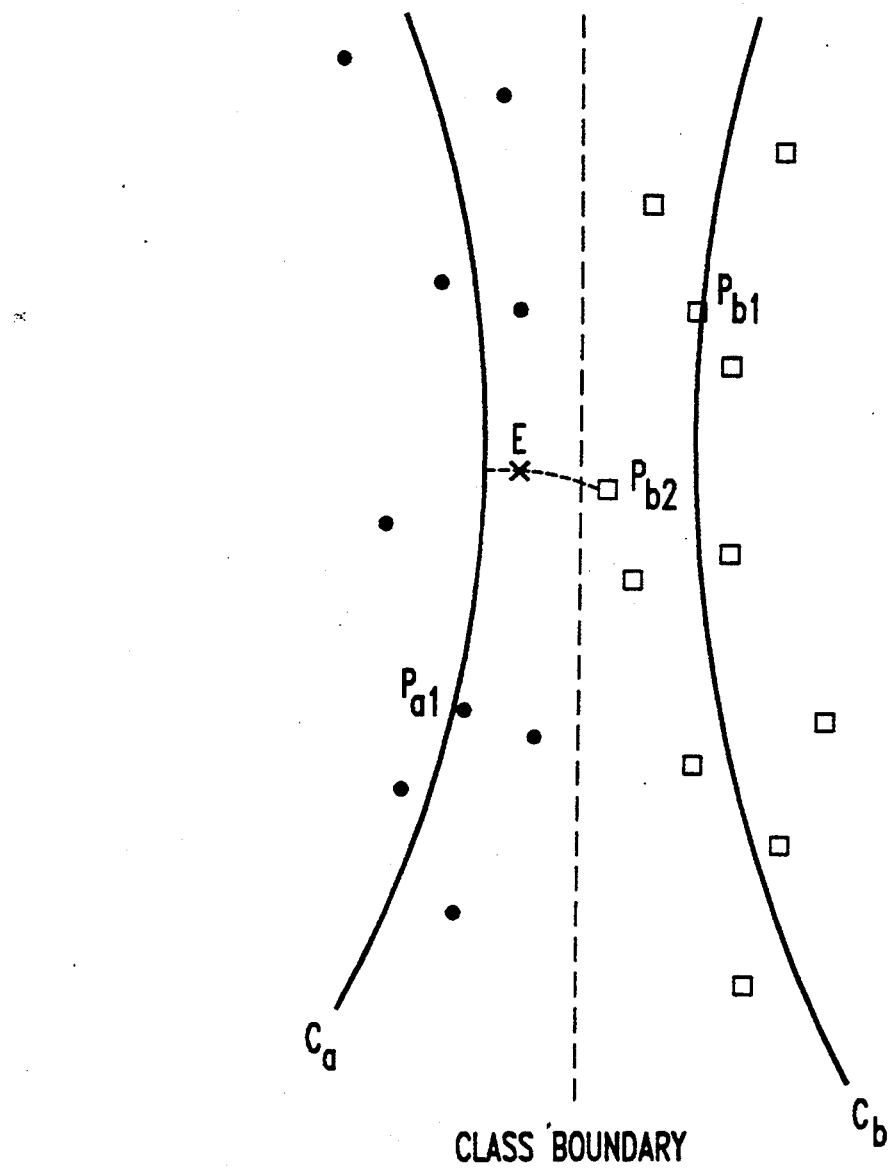

FIG. 2 illustrate how the KNN algorithm can fail if the conventional euclidian distance is used in the calculation. In this case, the example is of class "circle" but the closest prototypes are of class "square." Therefore, the pattern is incorrectly classified by the processes of the prior art.

The procedure illustrated above is typical of "distance based" comparison systems in the sense that a distance is computed between each of the prototypes and the example, and some decision is done as to the class of the example based on these distances. The invention aims at replacing the distance by a new distance function with properties to be defined hereinafter. It is exemplified below by a description of its use in the KNN algorithm but is not restricted to it.

Workers in the art recognize that a common problem in designing recognition machines is to compute a classification function which is known apriori to be invariant with respect to a set of transformations. In character recognition, classification should be insensitive to vertical and horizontal translations, to scaling and to rotations. Referring to FIG. 2, assume that the curve $C_a$ and $C_b$ illustrates the effect of these transformations on patterns $P_{a1}$ and $P_{b1}$. Them exists such transformation curves for every prototype of alphanumeric script, for example. Since the transformations have been chosen to leave the class invariant, these curves cannot cross the class boundary line (indicated by a dashed line on the Figure). It is, therefore, an advantage to evaluate the distance from the example E to the closest transformed prototype rather than to the plain prototype. It is readily seen on the Figure that the distance from E to $C_a$ is smaller than the distance from E to $P_{b2}$. The example E will, therefore, be classified correctly as a circle using the invention. By using a distance which considers all the transformation of each prototype, it is much more likely that the closest prototype will be of the correct class. The transformation curve can not cross the class boundary because of the constraint imposed by the definition of invariance.

The difficulty of calculating the "distance" described above lies in finding efficiently the closest point to the transformation curves for each of the prototypes. This process is computationally very expensive.

However, for small transformations, the curve can be approximated by a linear curve, one which is tangent to the transformation curve at the point of interest. The linear curve (called the "hyperplane") may be characterized by a set of tangent vectors which can be derived directly from the specified transformations.

In many cases in the art of alphanumeric symbol recognition, the classification function is known to be locally invariant with respect to a set of locally differentiable transformations of the symbols. In other words, it may be known that the symbol class at a point U does not change for a point near U, which is obtained by applying a small transformation to U.

In this case, the set of all patterns obtained by applying transformations of the set (or combinations thereof) to U is a differentiable surface that contains U. The hyperplane tangent to the surface at U is called the tangent plane. This plane can be described by a set of basis vectors called the tangent vectors, which are computed as explained below.

The first step is to parameterize the set of transformations. All the transformations of pattern U can be obtained from U and some parameter $\alpha$ (which in some cases will be multidimensional) by computing a function $s(\alpha, U)$. The parameter $\alpha$ could be, for instance, the angle of a rotation, the displacement in a translation, or a pair representing both if $\alpha$ is multidimensional. Some reasonable restrictions are made on s. In particular $s(0, U) = U$ should hold, and s should be differentiable with respect to $\alpha$ and U. The first restriction merely states that 0 is the value of the parameter that corresponds to the identity. It is a convenient origin. The differentiability makes the computation of the tangent vectors more accurate. This latter restriction can require some processing of the data, in order to smooth the patterns so that small transformations produce small variations of the patterns.

For instance, in the case where the transformations are rotations of digital images, values between pixels of the original image U should be interpolated in order to compute the rotated image. Typical schemes include smooth interpolation functions such as convolution, cubic spline, etc . . . The dimension of the parameter $\alpha$ depends on the complexity of the transformation space considered. If only two transformations are considered, the $\alpha$s are pairs.

Figure 3:
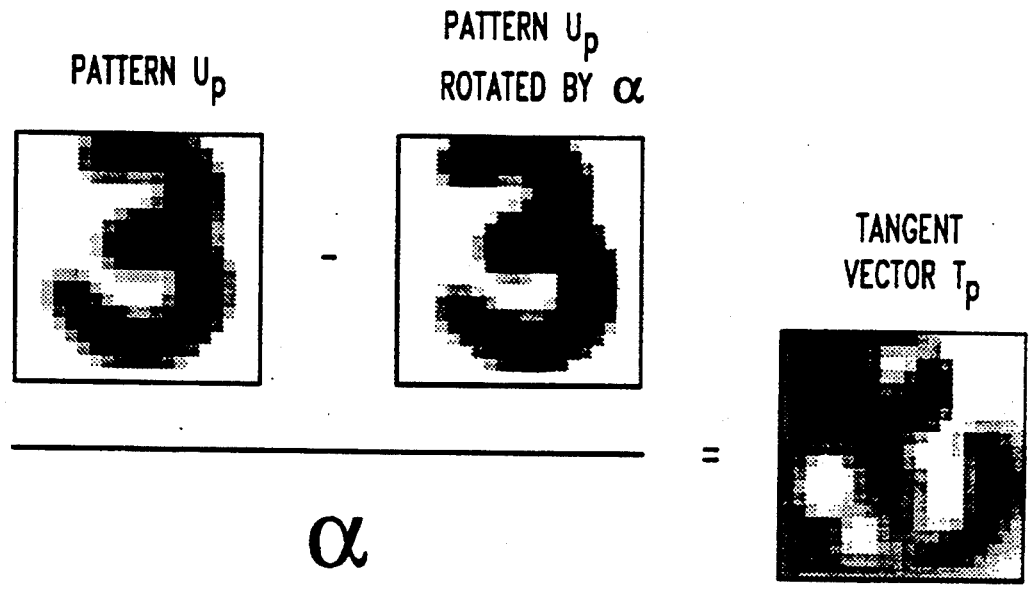
FIG. 3 is a chart illustrating the concept of tangent vector derivation applied to pixel data.

A simple illustration of the tangent vector for the case where the input is a 16×16 pixel image, is provided in FIG. 3 where a particular transformation of the number "3", a "rotational transformation," is presented. First, an original pixel image denoted U, is used to construct a further image denoted $s(\alpha, U)$, differing from the original in that it is had undergone a rotation by an angle $\alpha$. The transformed image can be obtained by remapping the coordinates and estimating the new value of each remapped pixel by interpolating between original pixels.

As seen in FIG. 3, the tangent vector is defined as the (original image U minus the rotated image $s(\alpha, U)$) divided by $\alpha$. A resulting pixel image, denoted T, is thereby created and is one of the desired generators, or tangent vectors. The operations depicted (minus, plus, and scalar multiplication) are defined to be pixel value by pixel value subtraction and addition, and multiplication by a scalar.

Workers in the art will appreciate that in accordance with the teaching of the Lie group formalism, the limit of the tangent vector when $\alpha$ tends to 0 is called the Lie derivative and is noted $\partial s(\alpha, U)/\partial \alpha$.

Figure 4:
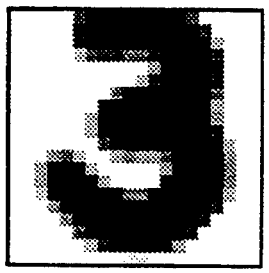
FIG. 4 is a chart illustrating the creating of a diagonal translation using generators as applied to pixel data.
Figure 4:
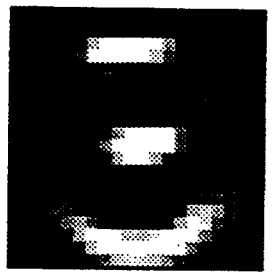
Figure 4:
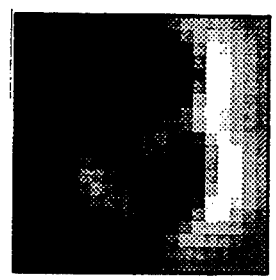
Figure 4:
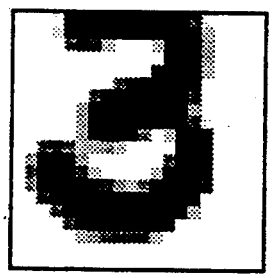
Figure 5:
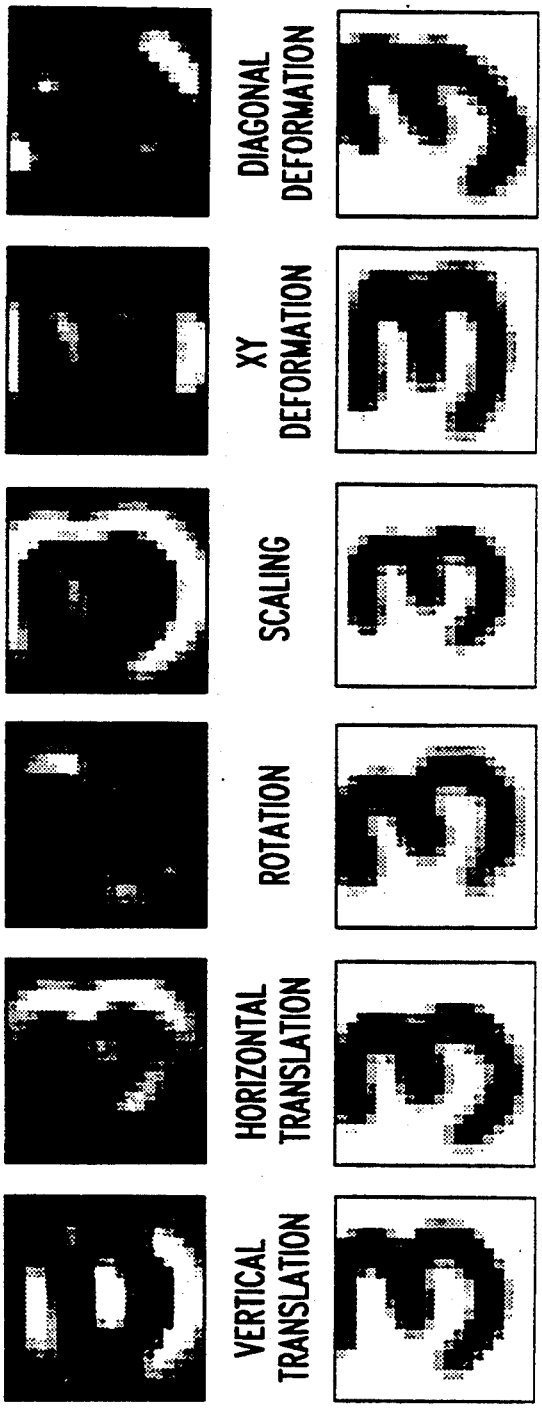
FIG. 5 is chart showing creation of plural transformed pixel images using tangent vectors.

To further illustrate why only a few tangent vectors completely specify the whole tangent plane, FIG. 4 shows how the generators for horizontal and vertical translations can be used to generate diagonal translations. The generators for vertical and horizontal translations are obtained in a way similar to the rotation described above. To obtain a diagonal translation from the tangent vectors, it suffices to linearly combine the tangent vectors corresponding to the horizontal and vertical translations of the original image. FIG. 5 shows six tangent vectors, which generate a tangent plane of dimension 6. These six transformations can generate any linear coordinate transformation in the plane. Rotation of any center can be obtained by combining rotation and translation; skewing of any direction can be obtained by combining deformation, rotation and scaling, etc.

Figure 6:
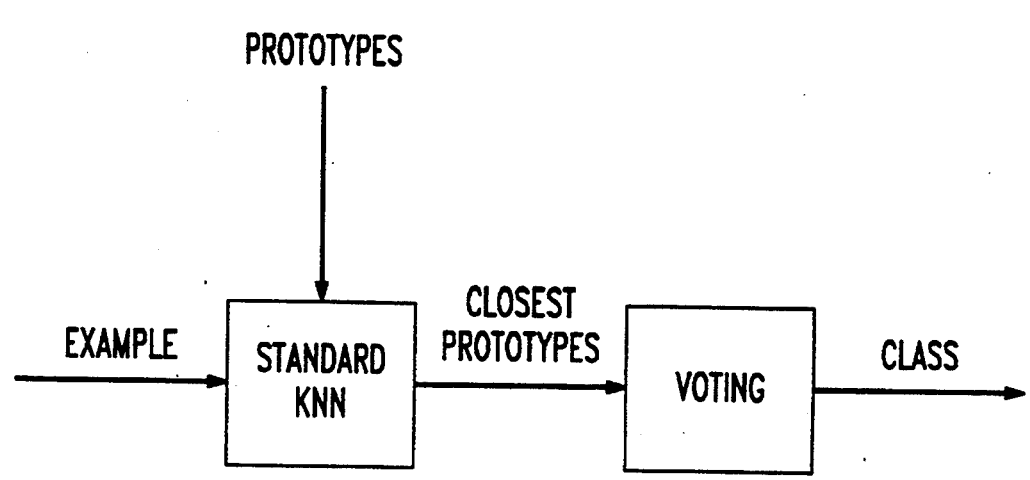
FIGS. 6 and 7 are high-level schematic block diagrams showing information processing for obtaining closest prototype readouts.

In order to appreciate the present invention, it is useful to return briefly to the prior art as exemplified by processes employing the KNN algorithm. In the operation mode, as depicted in FIG. 6, a example pattern is presented to classifier denoted 15, which is compared to a database of prototypes. The database may, for example, be created by collecting a large amount of patterns exactly as the examples would be collected, and assigning them class labels. The closest prototypes calculated by using euclidian distance are identified, and a voting scheme carded out in the voting processor 16 determines which class the example belongs to. In the case of KNN, the K closest prototypes vote for their class and the class with the most votes is outputted by the voting processor 16.

In the most sophisticated versions of prior art recognition engines, relevant features are extracted from the data; and those features are compared rather than the raw data.

Figure 7:
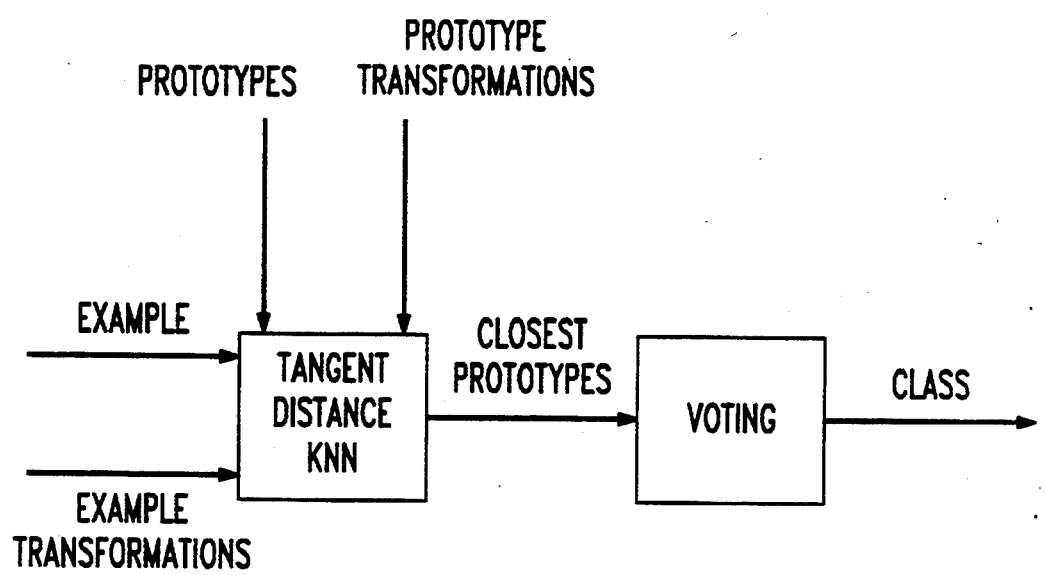

The present invention is a new "distance" measure which uses an augmented database containing information about a specific set of transformations. A new procedure for classifying the data, illustrated in FIG. 7, makes use of the additional information for both the examples and the prototypes to find more accurately the prototypes which are closest in distance to the example being presented to the recognizer.

In the simplest version of the invention, the additional information consists only of the tangent vectors as computed, for example, in FIG. 3, for each of the transformations. The result is a linear approximation of the real transformation.

Figure 8:
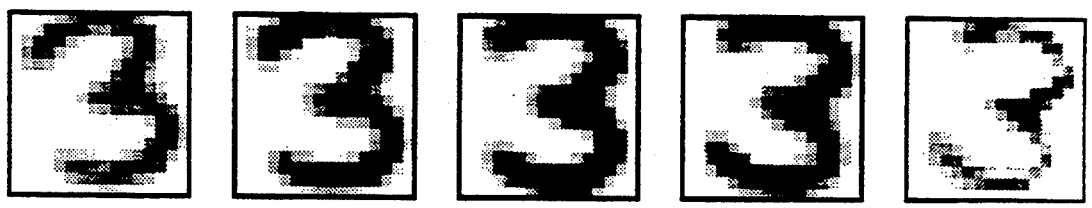
FIG. 8 illustrates the tangent plane equation in accordance with the invention as applied to pixel data.
Figure 8:
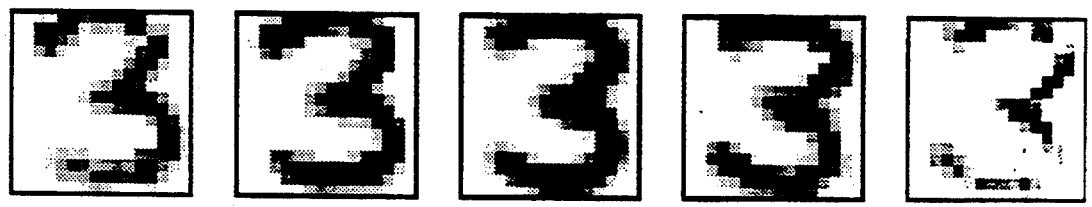

FIG. 8 illustrates for the case of 2D images of digits and their rotations, the difference between the pixel patterns in the tangent plane and the patterns obtained by the real transformation. As can be seen, the approximation is valid for small transformations (compare line A and line B, center), but does not work as well for large transformation (compare line A and line B, at the edges). A good indicator of whether the transformation is too large is pixel saturation.

The images of line B are generated using the graphical equation depicted in Line C of FIG. 8, while the images of Line A are generated by rotating and resampling the image.

In what follows, it is assumed that the process of computing the tangent vectors has been performed for both the example to be recognized and the prototypes. The process of measuring the distance between two hyperplanes defined each by a point E and P (the example and the prototype) and a set of tangent vectors $L_{Ei}$ and $L_{Pj}$ (corresponding to the transformation of the example and the prototype, will be illustrated.

Figure 9:
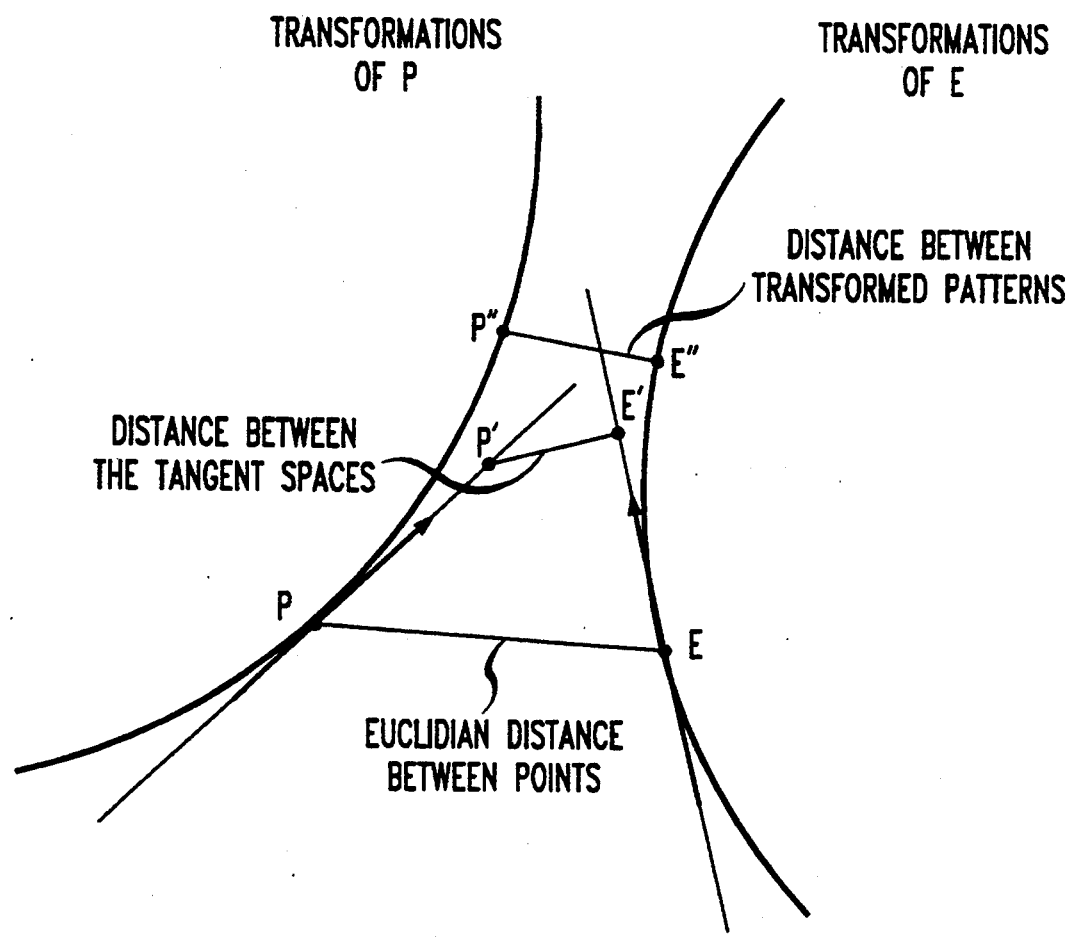
FIG. 9 is a graph illustrating the relationships and concepts of "distances" in accordance with the invention.

The distance between two hyperplanes as seen in FIG. 9 is uniquely defined to be the shortest distance between any two pair of points of each hyperplane. A geometric interpretation of this aspect of the invention is given in FIG. 9. In the non-degenerative case, them exists a unique such pair noted E' and P'. Since E' belongs to the hyperplane going through example E with direction $L_{Ei}$, there exists a set of coefficients $\alpha_i$ such that the equation $$E - E' = \sum_{i=0}^{m-1} \alpha_i L_{Ei} \quad (1)$$

Similarly, since P' belongs to the hyperplane going through prototype P with direction $L_{Pi}$, there exists a set of coefficients $\beta_j$ such that the equation $$P - P' = \sum_{j=0}^{m-1} \beta_j L_{Pi} \quad (2)$$

It can be shown that in order to minimize the distance $$\|E' - P'\|^2 \quad (3)$$

between the two hyperplanes, $\alpha_i$ and $\beta_j$ must be given by the solution of the system:

$$\begin{bmatrix} (P_E - P_P)^T L_{E1} \\ \vdots \\ (P_E - P_P)^T L_{En} \\ \hline (P_E - P_P)^T L_{P1} \\ \vdots \\ (P_E - P_P)^T L_{Pm} \end{bmatrix} - \begin{bmatrix} L_{E1}^T L_{E1} \ldots L_{E1}^T L_{En} & L_{P1}^T L_{E1} \ldots L_{Pm}^T L_{E1} \\ \vdots & \vdots \\ L_{En}^T L_{E1} \ldots L_{En}^T L_{En} & L_{P1}^T L_{En} \ldots L_{Pm}^T L_{En} \\ \hline L_{P1}^T L_{E1} \ldots L_{P1}^T L_{En} & L_{P1}^T L_{P1} \ldots L_{Pm}^T L_{P1} \\ \vdots & \vdots \\ L_{Pm}^T L_{E1} \ldots L_{Pm}^T L_{En} & L_{P1}^T L_{Pm} \ldots L_{Pm}^T L_{Pm} \end{bmatrix} \begin{bmatrix} \alpha_1 \\ \vdots \\ \alpha_n \\ \beta_1 \\ \vdots \\ \beta_m \end{bmatrix} = 0 \quad (4)$$

The above system can be described in a more compact way:

$$\begin{bmatrix} C_E \\ C_P \end{bmatrix} - \begin{bmatrix} L_{EE} & L_{EP} \\ L_{PE} & L_{PP} \end{bmatrix} - \begin{bmatrix} \alpha \\ \beta \end{bmatrix} = 0 \quad (5)$$

which has as a solution:

$$\alpha = (L_{EP} L_{PP}^{-1} L_{PE} - L_{EE})^{-1} (L_{EP} L_{PP}^{-1} C_P - C_E) \quad (6)$$

$$\beta = (L_{PP} - L_{PE} L_{EE}^{-1} L_{EP})^{-1} (L_{PE} L_{EE}^{-1} C_E - C_P) \quad (7)$$

It should be noted that $L_{EE}^{-1}$ does not need to be recomputed from prototype to prototype; and that $L_{PP}^{-1}$ can be stored for each prototype. Therefore only two small systems, one m by m and one m by n, need to be solved at recognition time.

Additional constraints can be imposed on $\alpha$ and $\beta$ to prevent the effect of too large a deformation. For instance, if both the prototype and the example are scaled down to a few pixels, the distance between them may be arbitrarily small and therefore meaningless. A constraint on the maximum values of the scaling parameter would prevent this from happening.

If $\alpha$ or $\beta$ are large, E' and P' is far away from the transformation curve (see FIG. 9) and goes beyond the limit of validity of the linear approximation, the result may be an incorrect evaluation of the distance. One of several way to circumvent that problem is to limit the values of $\alpha_i$ and $\beta_j$ to be less in absolute value than some predefined constant. These constant can be chosen to prevent excessive pixel saturation of the transformed image. The resulting E' and P' will therefore not be too far from E and P.

Figure 11:
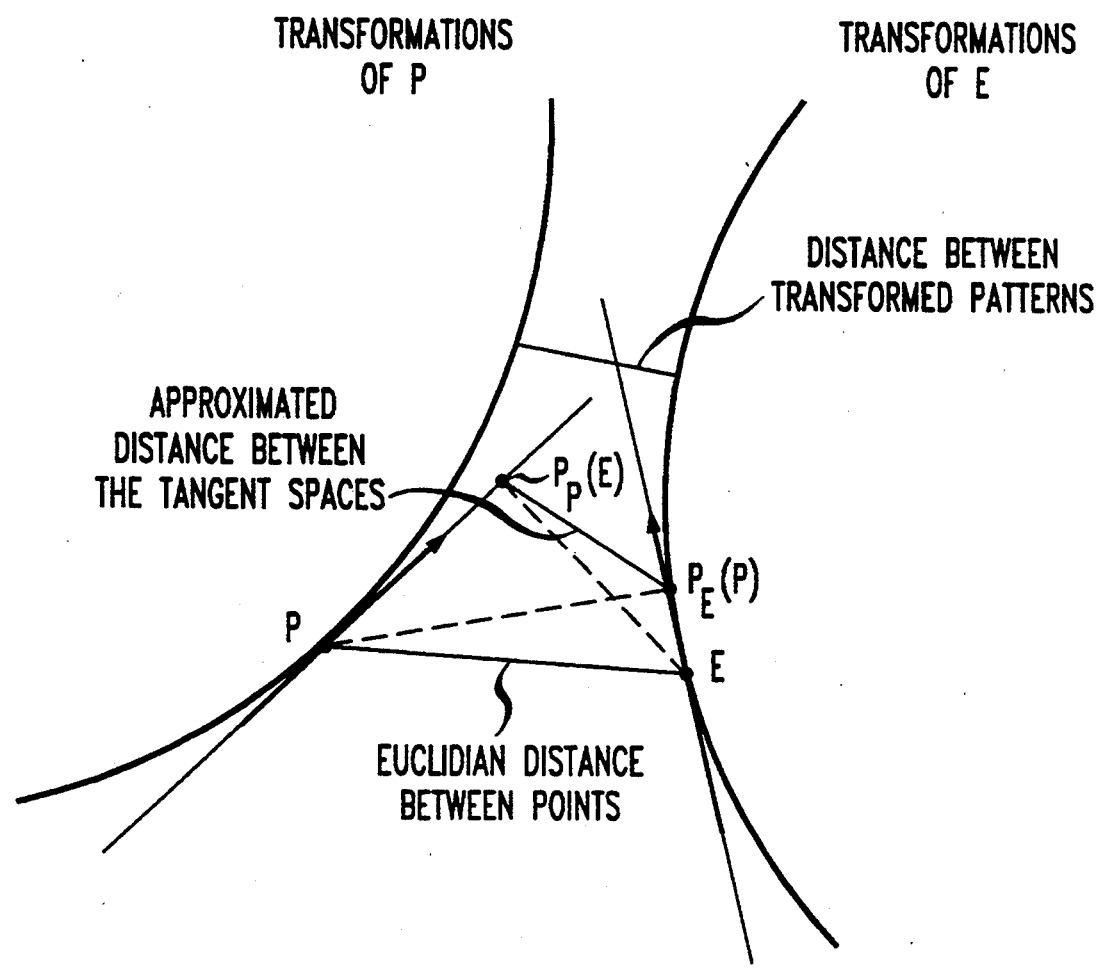
FIG. 11 is a graph illustrating the relationships and concepts of an approximation of the "distance" in accordance with the invention.

One way to avoid solving the equation system 4 at recognition time, is to approximate the distance between the two hyperplanes. One simple approximation consists of projecting P and E on the respective opposite hyperplanes to obtain two projections $P_{E(P)}$ and $P_{P(E)}$ and to measure the distance between those two projections. This idea is illustrated in FIG. 11. This distance is an approximation of the true distance between tangent planes, is better than the euclidian distance and only moderately computationally expensive. It is furthermore possible to find the smallest distance between the two lines defined by the pairs $(E, P_{E(p)})$ and $(P, P_{P(E)})$. This approximation is better than the previous one because it finds the two closest points between two lines with are tangent to the curve of transformation. These two lines being subspaces of the tangent planes, most of the work done by solving system 4 is done by finding the closest points between the two lines. This is done at almost the same computational cost as the previous approximation.

Other variations include considering only subspaces of the tangent hyperplanes of the prototype or of the example. Particular cases include when the prototype tangent space is the prototype itself, or when the example tangent space is the example itself.

In a given recognition application it may be desired to find the exact "distance" between the two transformation curves. Referring to FIG. 9, finding exact distances would correspond to computing P'' and E''.

In accordance with another aspect of the invention, finding the exact "distance" is made possible by recognizing that the calculation of P' and E' may also be one iteration of a more complex or staged iterative process to compute P'' and E''. After computing P' and E', $\alpha$ and $\beta$ are the coordinates of these points in the tangent planes. Since these parameters define a direction in the tangent plane, it is possible to reconstruct the true transformation corresponding to P' and E', that is, to project these points back on their respective transformation curves. This may involve some resampling. For instance in the case of 2-dimensional images, it may be necessary to generate a translation of a fraction of a pixel. The iterative or staged process can be computationally more expensive, but may nonetheless yield the result of computing a distance which is advantageously not restricted to small transformations.

Referring again to the process of FIG. 9, the iterative process corresponds to projecting P' and E' back onto the transformation curve. The two projections can then be used as the initial P and E of the next iteration. This iterative process practices the so-called Newtown algorithm and will converge to the points P" and E" in relatively few iterations, provided that the transformation curves are reasonably smooth. The Newton Algorithm is more fully defined in the book "Practical Methods of Optimization," by R. Fletcher, 1987.

Figure 10:
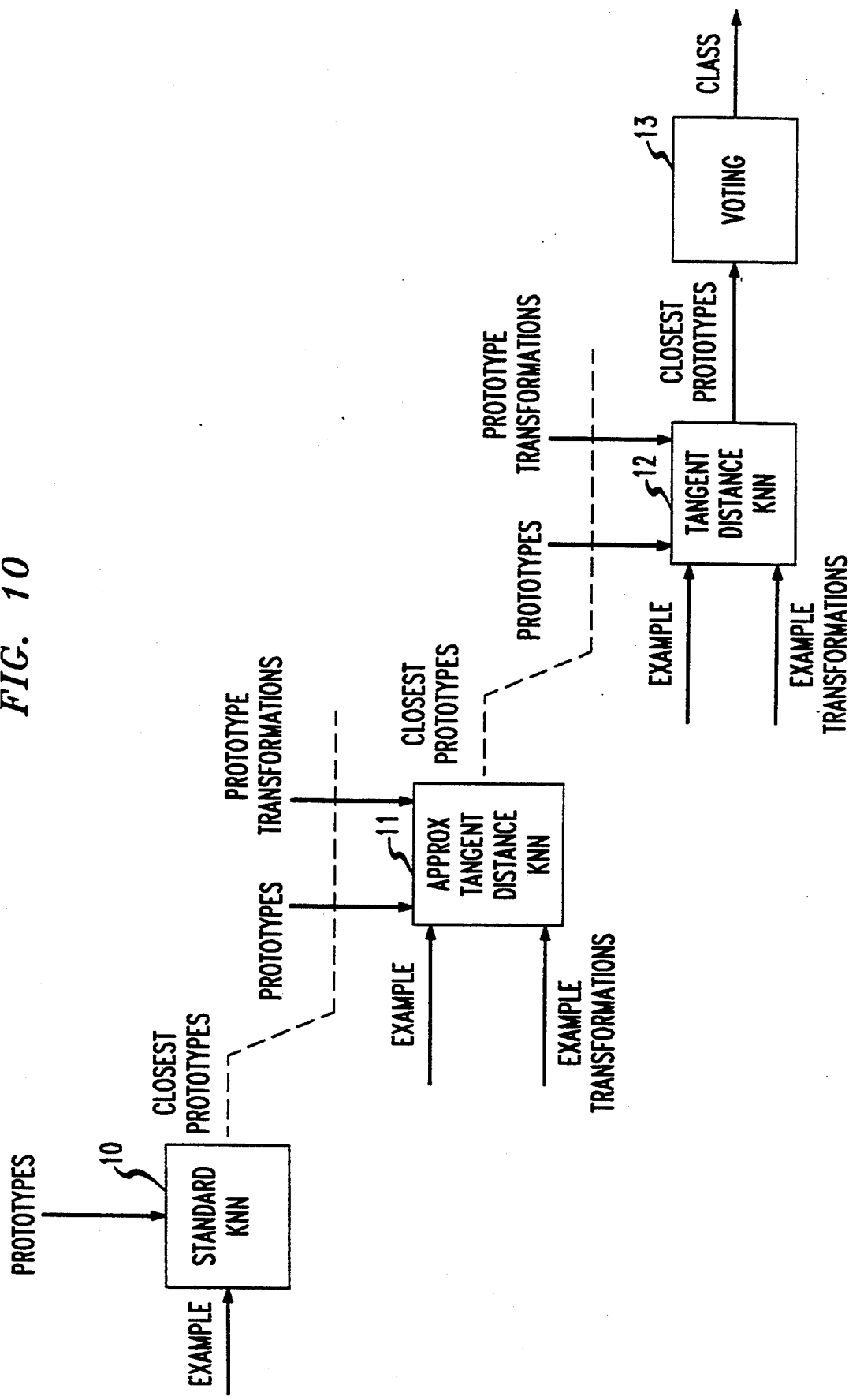
FIG. 10 is a high-level schematic block diagram showing iterative processing steps for finding of the closest prototype.

Finally, if it is desired to reduce the computational time for computing the distance by establishing a hierarchy of distances, corresponding to their accuracy and computational time, a process for achieving same is noted in FIG. 10.

Since the euclidian distance is very fast in the sense that it only involves computing at most 3N multiply adds, where N is the number of pixels, it is possible in accordance with the invention to go through a large database of prototypes, son the result by distances and retain only a small percentage of that database corresponding to the prototypes that are closest to the example. Since the euclidian distance is known to not give very good performance, the selected patterns can be compared with the example using a more complex distance. In turn, the remaining prototypes can be sorted with this new distance and a small fraction of those can be selected. The process can be repeated several times, progressing with each step to a distance that is more complex to compute, but entails fewer and better prototypes.

Other methods can be found in the prior art to filter the prototypes, such as the LVQ algorithm which is described in "Statistical Pattern Recognition with Neural Network: Benchmarking Studies," published in "Proceedings of the IEEE Second International Conference on Neural Networks," by Kohonen, T. Barna, G. and Chrisley, R. 1988. Such methods can be combined with the invention by replacing the computation of the distance they are based on by our new-distance.

The invention was tested on a pattern recognition problem. The goal was to classify handwritten digits from 2-dimensional pixel images. A database of 9709 prototypes was used to recognize 2007 examples or unknown symbols. On real samples human readers or interpreters do not achieve typically an accuracy rate greater than about 97.5%. An advanced neural network at the time of this invention when applied to the samples delivered a raw recognition rate of 96% as reported in "Back-Propagation Applied to Handwritten Zipcode Recognition" in "Neural Computation" by Le Cun, Boser, Denker, Henderson, Howard, Hubbard and Jackel. A prior art machine practicing the KNN algorithm with euclidian distance exhibited a 94.3% recognition accuracy rate; and a KNN-based machine applying euclidian distance on features exhibited a 95% recognition accuracy rate.

An example of the processing practiced by the present invention is illustrated by the diagram of FIG. 10, which workers in the art will recognize readily as being executable on machine such as a SPARCII Sun workstation. The upper left processor 10 receives examples and uses the euclidian distance calculation as described with, for example 9709 prototypes. The 100 closest prototypes with the euclidian distance are selected by a process of sorting the prototypes according to their euclidian distance to the example, and then selecting the 100 prototypes with the smallest euclidian distance.

Referring to FIG. 10, the middle processor 11 computes an approximation of the tangent distance by projecting the prototypes and the example on their respective opposite tangent hyperplanes. Using this approximation, the distances between the 100 prototypes selected above and the example are computed. The prototypes are again sorted in processor 11 in order of increasing distance. The (for example) five closest prototypes are forwarded to processor 12. In that stage, the most complex distance (the one based on solving equation system 4) is used to compare the five prototype to the example. The closest prototype then "votes" for, that is, determines, the class of the example. The recognition rate of the inventive process utilizing this algorithm was measured as 97.4, which is comparable to human performance and well above prior an automatic recognition machines.

I claim:

1. A pattern-classifying machine for assigning identification labels to unknown input patterns such that each input pattern is classified as a member of only one of several labeled prototype classes, said classifying machine comprising (a) a database consisting of data files of patterns which are known members of each prototype class; (b) a pattern comparator; (c) means for inputting said input patterns and said known members to said comparator; and (d) means for making predetermined transformations of prototype patterns and of input patterns, the improvement comprising:

means for generating tangent vector patterns directly from selected transformations of each said prototype pattern, wherein: each selected transformation leaves the prototype label invariant; each selected transformation operates on image vectors in a vector space that represents pixel values; and each of the tangent vector patterns is represented in the vector space as a vector proportional to a difference between transformed and original patterns;

means for generating for each said prototype pattern a transformed prototype pattern, by adding to each said prototype pattern selected linear combinations of said first tangent vector patterns;

means for computing the Euclidean distance between each of said transformed prototype patterns and a one of said; input patterns and means for determining the smallest of the just-computed Euclidean distances, the smallest said distance determining which labeled prototype pattern is closest to said input pattern.

2. A pattern-classifying machine for assigning identification labels to unknown input patterns such that each input pattern is classified as being a member of only one of several labeled prototype classes, said classifying machine comprising (a) a database consisting of data files of patterns which are known members of each prototype class; (b) a pattern comparator; (c) means for inputting said input patterns and said known members to said comparator; and (d) means for making predetermined transformations of prototype patterns and of input patterns, the improvement comprising:

means for generating tangent vector patterns directly from selected transformations of each said input pattern, wherein: each selected transformation leaves the input pattern invariant as to its class; each selected transformation operates on image vectors in a vector space that represents pixel values; and each of the tangent vector patterns is represented in the vector space as a vector proportional to a difference between transformed and original patterns;

means for generating for each said input pattern a transformed input pattern, by adding to each said input pattern selected linear combinations of said tangent vector patterns;

means for computing the Euclidean distance between each of said transformed example patterns and a one of said prototype patterns; and means for determining the smallest of the just-computed Euclidean distances, the smallest said distance determining which labeled prototype pattern is closest to said input pattern.

3. Apparatus in accordance with claims 1 or 2, wherein said transformed patterns are formed by rotation.

4. Apparatus in accordance with claims 1 or 2, wherein said transformed patterns are formed by skewing.

5. Apparatus in accordance with claims 1 or 2, wherein said transformed patterns are formed by translation.

6. Apparatus in accordance with claims 1 or 2, wherein said transformed patterns are formed by line thickness change.

7. Apparatus in accordance with claims 1 or 2, wherein said transformed patterns are formed by grey-level changes.

8. Apparatus in accordance with claims 1 or 2, wherein said transformed patterns are formed by alphanumeric symbols.

9. Apparatus in accordance with claim 8, wherein said patterns comprise alphanumeric address information on postal items to be sorted for ultimate destination.

10. Apparatus in accordance with claim 9, further comprising a video scanner, means for transporting said address information past said scanner, means for connecting said scanned information into individual pixel maps of each scanned unknown alphanumeric symbol, and a memory store fore receiving determinations of the labeled prototype which is closest as a pattern to each said unknown example.

* * * * *